(12) United States Patent
Offenberg et al.

(10) Patent No.: US 8,627,719 B2
(45) Date of Patent: Jan. 14, 2014

(54) MICROMECHANICAL SENSOR ELEMENT, METHOD FOR MANUFACTURING A MICROMECHANICAL SENSOR ELEMENT AND METHOD FOR OPERATING A MICROMECHANICAL SENSOR ELEMENT

(75) Inventors: Michael Offenberg, Kirchentellinsfurt (DE); Michael Baus, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 1005 days.

(21) Appl. No.: 12/459,993

(22) Filed: Jul. 9, 2009

(65) Prior Publication Data

US 2010/0011860 A1 Jan. 21, 2010

(30) Foreign Application Priority Data

Jul. 18, 2008 (DE) .......................... 10 2008 040 525

(51) Int. Cl.
*G01P 15/125* (2006.01)
(52) U.S. Cl.
USPC ..................................... 73/514.32; 73/514.16
(58) Field of Classification Search
USPC ............................ 73/514.32, 514.16; 438/50; 257/E21.211
See application file for complete search history.

(56) References Cited

U.S. PATENT DOCUMENTS

| | | | | |
|---|---|---|---|---|
| 3,120,622 A * | 2/1964 | Dranetz et al. | ................. | 310/329 |
| 3,233,465 A * | 2/1966 | Tolliver et al. | ............. | 73/514.34 |
| 3,400,284 A * | 9/1968 | Shmuel | ........................ | 310/319 |
| 4,306,456 A * | 12/1981 | Maerfeld | .................... | 73/514.28 |
| 4,447,755 A * | 5/1984 | Ghiurea | ........................ | 310/329 |
| 4,586,377 A * | 5/1986 | Schmid | ..................... | 73/514.34 |
| 5,117,696 A * | 6/1992 | Schmid | ..................... | 73/514.34 |
| 5,193,392 A * | 3/1993 | Besson et al. | .............. | 73/514.29 |
| 5,377,523 A * | 1/1995 | Ohta et al. | ..................... | 73/1.38 |
| 5,388,459 A * | 2/1995 | Inoue et al. | ................. | 73/514.34 |
| 5,996,409 A * | 12/1999 | Funk et al. | ................. | 73/504.04 |
| 6,038,924 A * | 3/2000 | Lee et al. | ................... | 73/514.34 |
| 6,209,395 B1 * | 4/2001 | Kristensen | ................. | 73/514.34 |
| 6,397,677 B1 * | 6/2002 | Kinsley et al. | ............. | 73/514.34 |
| 6,435,000 B1 * | 8/2002 | Takahashi et al. | ............. | 73/1.38 |
| 6,474,134 B1 * | 11/2002 | Takahashi et al. | ............. | 73/1.38 |
| 6,873,931 B1 * | 3/2005 | Nower et al. | ................. | 702/151 |
| 2005/0284222 A1* | 12/2005 | Johnson et al. | ............ | 73/504.02 |
| 2008/0078246 A1* | 4/2008 | Li | ............................... | 73/504.02 |

FOREIGN PATENT DOCUMENTS

| | | |
|---|---|---|
| CN | 101127514 | 2/2008 |
| CN | 101294844 | 10/2008 |
| DE | 100 00 368 | 7/2001 |
| EP | 2 011 762 | 1/2009 |

\* cited by examiner

*Primary Examiner* — Peter Macchiarolo
*Assistant Examiner* — Samir M Shah
(74) *Attorney, Agent, or Firm* — Kenyon & Kenyon LLP

(57) ABSTRACT

A micromechanical sensor element includes: a substrate; a first seismic mass suspended from the substrate, which is deflectable from a first rest position by an acceleration acting perpendicularly to a main plane of extension; and a second seismic mass, which is deflectable from a second rest position by the acceleration. At least a partial overlap is provided between the first seismic mass and the second seismic mass perpendicular to the main plane of extension.

9 Claims, 1 Drawing Sheet

MICROMECHANICAL SENSOR ELEMENT, METHOD FOR MANUFACTURING A MICROMECHANICAL SENSOR ELEMENT AND METHOD FOR OPERATING A MICROMECHANICAL SENSOR ELEMENT

BACKGROUND OF THE INVENTION

1. Field of the Invention

The present invention relates to a micromechanical sensor element, e.g., an acceleration sensor, having two deflectable seismic mass elements.

2. Description of Related Art

Such micromechanical sensor elements are generally known. Published German patent document DE 100 00 368 A1, for example, describes an acceleration sensor having a substrate, which has an anchoring device, and a rotating mass, which is connected to the anchoring device via a bending spring device such that the rotating mass is elastically deflectable from its rest position. The rotating mass is furthermore developed as a rocker structure above electrode regions for detecting an acceleration in the z direction.

BRIEF SUMMARY OF THE INVENTION

The inventive micromechanical sensor element, the inventive method for manufacturing a micromechanical sensor element, and the inventive method for operating a micromechanical sensor element according to the present invention have the advantage over the related art that, on the one hand, the detection of an acceleration perpendicular to the main plane of extension is decoupled from possible substrate warps, and on the other hand, the detection sensitivity of the micromechanical sensor element is increased considerably for the same detection surface area in parallel to the main plane of extension. Alternatively, the sensor element according to the present invention allows for a reduction or halving of the detection surface area for an essentially identical detection sensitivity. The listed advantages are achieved by the fact that, in an acceleration of the micromechanical sensor element perpendicularly to the main plane of extension, not only a first deflection of the first seismic mass from the first rest position, but also at the same time a second deflection of the second seismic mass from the second rest position is produced, in particular a first moment of inertia of the first seismic mass differing from a second moment of inertia of the second seismic mass such that preferably the first and the second excursion occur in antiphase. Thus the distance between the first and the second seismic mass perpendicular to the main plane of extension is changed distinctly more both by the first deflection as well as by the second deflection such that the detection sensitivity with respect to a change in distance, which as described in the related art only occurs from one side (motion merely of the rotating mass with respect to the fixed substrate), is distinctly increased and, due to the at least partial overlap of the first and the second seismic mass, the detection surface area parallel to the main plane of extension is not increased or is increased only insignificantly. By measuring the change in distance directly between the first and the second seismic mass, in contrast to the measurement of the change in distance between the rotating mass and the substrate described in the related art, the measurement of the acceleration is independent of substrate warps perpendicular to the main plane of extension caused by manufacturing, which reduce the accuracy of the measurement. The substrate, the first seismic mass and/or the second seismic mass preferably comprise a semiconductor material, e.g., silicon.

An example embodiment provides for the first seismic mass to be fastened indirectly or directly on the substrate essentially rotatably about a first axis of rotation using a first coupling device and for the second seismic mass to be fastened indirectly or directly on the substrate essentially rotatably about a second axis of rotation using a second coupling device, the first and the second axis of rotation being situated in parallel to each other and/or being situated essentially congruently perpendicular to the main plane of extension.

Particularly advantageously, the acceleration thus produces a first tilt or first rotary motion of the first seismic mass relative to the substrate and relative to the second seismic mass about the first axis of rotation and a second tilt or second rotary motion of the second seismic mass relative to the substrate and relative to the first seismic mass about the second axis of rotation.

Another example embodiment provides for the first seismic mass to have a first mass symmetry axis and the second seismic mass to have a second mass symmetry axis, the first and the second mass symmetry axis preferably being oriented essentially in parallel to the first and second axis of rotation, and the first mass symmetry axis being particularly preferably situated so as to be set apart from the second mass symmetry axis in parallel to the main plane of extension. A mass symmetry axis in the sense of the present invention comprises in particular an axis which connects the mass centers of a seismic mass, aligned with one another in parallel to the axis of rotation, with respect to the corresponding axis of rotation of the seismic mass. In other words, the mass symmetry axis of a seismic mass comprises in particular a mass center axis in parallel to the corresponding axis of rotation. In a particularly advantageous manner, the first and the second mass symmetry axis are set apart from each other in parallel to the main plane of extension such that the first and the second moment of inertia differ with respect to the acceleration and thus the first and the second deflection caused by the acceleration differ as well. In particular, the first mass symmetry axis is situated on a first side of the first and second axis of rotation in parallel to the main plane of extension and the second mass symmetry axis is situated in parallel to the main plane of extension on a second side of the first and second axis of rotation opposite from the first side such that the acceleration produces a first and second deflection in antiphase. In the sense of the present invention, first and second deflection in antiphase preferably means that the first deflection comprises a first rotary motion of the first seismic mass about the first axis of rotation, which runs counter to a second rotary motion of the second seismic mass about the second axis of rotation in the second deflection. Advantageously, the distance between the first and the second seismic mass in the acceleration is thus simultaneously changed both by the first deflection as well as by the second deflection such that the rate of change of the change in distance and thus the detection sensitivity is markedly increased.

Another example embodiment provides for the first and the second coupling elements to be situated congruently perpendicular to the main plane of extension and to comprise preferably reversibly elastic spring elements and particularly preferably torsion spring and/or bending spring elements such that advantageously the first and the second deflections of the seismic masses with respect to the substrate are made possible.

Another particularly preferred development provides for the first coupling element to be fastened directly on the substrate and/or for the second coupling element to be fastened directly on the first coupling element, the substrate and/or on the first seismic mass. The second seismic mass is particularly advantageously fastened via the second coupling element on the first seismic mass such that the second seismic mass is fastened only indirectly on the substrate and a direct connection of the second coupling element to the substrate is dispensable, in particular the first and the second seismic mass and the first and the second coupling element being producible together particularly cost-effectively as a joint structure in the substrate.

Another particularly preferred development provides for the first seismic mass to have a first and in particular another first electrode and for the second seismic mass to have a second and in particular another second electrode, an overlap between the first electrode and the second electrode and in particular an overlap between the additional first electrode and the additional second electrode being provided perpendicular to the main plane of extension. Particularly advantageously, measuring the distance between the first seismic mass and the second seismic mass using the first and the second electrode and/or the additional first and the additional second electrode is possible in a particularly simple manner, preferably a first electrical capacitance between the first and second electrode and/or a second electrical capacitance between the additional first and the additional second electrode being measured using a capacitance measuring device.

Another particularly preferred development provides for the first mass symmetry axis and/or the first axis of rotation to run between the first and the additional first electrode and for the second mass symmetry axis and/or axis of rotation to run between the second and the additional second electrode. Particularly advantageously, a change in distance between the first and the second seismic mass is thus measured on the basis of the first and the second deflection both on the first as well as on the second side of the first and second axis of rotation in parallel to the main plane of extension such that for example an increase in distance on the first side and a decrease in distance on the second side is detectable with comparative precision on the basis of the antiphase first and second deflection via a corresponding decrease of the first capacitance and a corresponding increase of the second capacitance.

Another particularly preferred development provides for the mass of the first seismic mass and the mass of the second seismic mass to differ such that in particular it is possible to produce a different first and second moment of inertia not only by an asymmetric suspension of the first and the second seismic mass, but advantageously also by a mass asymmetry between the mass of the first seismic mass and the mass of the second seismic mass.

Another particularly preferred development provides for the first seismic mass and the second seismic mass to be integrated into a housing, the housing having in particular a cover. Thus, the first seismic mass, the second seismic mass and/or the electrodes are particularly advantageously protected against external environmental influences. Particularly advantageously, a well-defined interior pressure is set in the housing, in particular via an appropriate interior medium, in order to obtain a desired deflection behavior of the first and the second seismic mass.

The present invention also provides a method for manufacturing a micromechanical sensor element, the substrate being provided together with the first seismic mass in a first manufacturing step, the second seismic mass being provided suspended from another substrate in a second manufacturing step, and in a subsequent third manufacturing step the additional substrate being situated on the substrate in such a way that an at least partial overlap is produced between the first seismic mass and the second seismic mass perpendicular to the main plane of extension. Advantageously, the sensor element of the present invention may thus be manufactured in a comparatively simple manner in only three comparatively cost-effective manufacturing steps. This is achieved particularly by the fact that the first and the second manufacturing step comprise well-known standard manufacturing steps for manufacturing two standard sensor elements according to the related art.

The present invention also provides a method for operating a micromechanical sensor element, the acceleration of the micromechanical sensor element being determined by measuring a change of a first electrical capacitance between the first and the second electrode and/or of a second electrical capacitance between the additional first and the additional second electrode. Particularly advantageously, in contrast to the related art, the method of the present invention for operating a micromechanical sensor element allows for a higher detection sensitivity for the same detection surface area because both the first or additional first electrode as well as the second or additional second electrode, respectively, perform a deflection motion as a consequence of the acceleration, and thus the change of the first capacitance, or respectively the change of the second capacitance, is increased. Furthermore, the disadvantage of a reduction of the measuring precision by substrate warps is removed.

Another particularly preferred development provides for the change of the first electrical capacitance to be converted into a first voltage signal and the change of the second electrical capacitance to be converted into a second voltage signal and for the difference between the first and the second voltage signal to be converted into a differential signal. In a particularly advantageous manner, the micromechanical sensor element thus outputs a differential signal as a function of the acceleration of the micromechanical sensor element, which is preferably supplied to an electrical or electronic evaluation circuit.

DETAILED DESCRIPTION OF THE INVENTION

Figure 1:
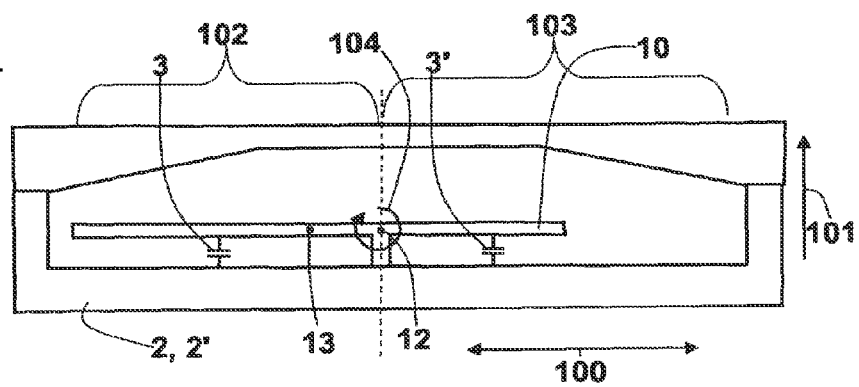
FIG. 1 shows a schematic lateral view of a micromechanical sensor element according to the related art.

FIG. 1 shows a schematic lateral view of a micromechanical sensor element 1 according to the related art, micromechanical sensor element 1 having a substrate 2 in the form of a housing 2' having a cover 2" and a first seismic mass 10, seismic mass 10 being suspended asymmetrically from substrate 10 by a first coupling device 11 in such a way that in the event of an acceleration 101 of micromechanical sensor element 1 perpendicular to a main plane of extension 100 of substrate 2, first seismic mass 10 experiences a first moment of inertia and consequently performs a first deflection in the form of a first rotary motion 104 about a first axis of rotation 12 oriented in parallel to main plane of extension 100. Seismic mass 10 has a first mass symmetry axis 13, which is situated in parallel to first axis of rotation 12 and which connects mass centers aligned with one another in parallel to first axis of rotation 12 with respect to the mass distribution of first seismic mass 10 perpendicular to first axis of rotation 12 and in parallel to main plane of extension 100. First mass symmetry axis 13 is set apart from axis of rotation 13 in parallel to main plane of extension 100 such that acceleration 101 produces the first moment of inertia and thus first rotary motion 104. Using a capacitance measuring device (not shown), first rotary motion 104 is measured by the measurement of a first electrical capacitance 3 between seismic mass 10 and substrate 2 on a first side 102 of seismic mass 10 and of a second electrical capacitance 3' between seismic mass 10 and substrate 2 on a second side 103 of seismic mass 10.

Figure 2:
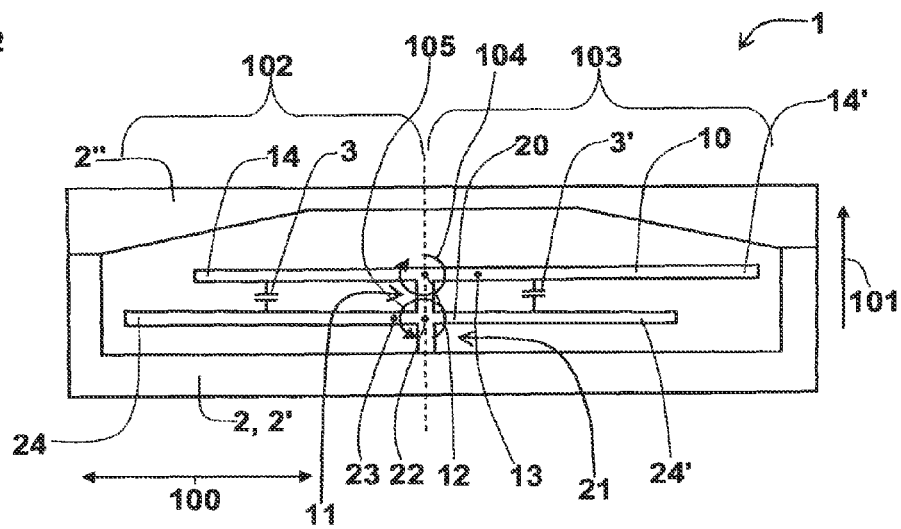
FIG. 2 shows a schematic lateral view of a micromechanical sensor element according to an exemplary embodiment of the present invention.

FIG. 2 shows a schematic lateral view of a micromechanical sensor element 1 according to an exemplary specific embodiment of the present invention, micromechanical sensor element 1 according to the exemplary specific embodiment of the present invention resembling the micromechanical sensor element according to the related art as illustrated in FIG. 1, micromechanical sensor element 1 having a second seismic mass 20, which is situated essentially in parallel to first seismic mass 10 between first seismic mass 10 and substrate 2 and is suspended from or fastened to substrate 2 asymmetrically and movably by a second coupling device 21. First seismic mass 10 is suspended from or fastened to second seismic mass 20 by first coupling device 11 and connected to substrate 2 only indirectly via second seismic mass 20 and second coupling device 21. Second seismic mass 20 is suspended asymmetrically in such a way that acceleration 101 perpendicular to main plane of extension 100 causes a second deflection in the form of a second rotary motion 105 of second seismic mass 20 about a second axis of rotation 22 as a result of a second moment of inertia, second axis of rotation 22 being oriented in parallel to first axis of rotation 12 and being situated in particular perpendicular to main plane of extension 100 congruently with respect to it. Second seismic mass 20 has a second mass symmetry axis 23, which set apart from second axis of rotation 22 and from first mass symmetry axis 13 in parallel to main plane of extension 100. In particular, first mass symmetry axis 13 is situated on a first side 102 with respect to first and second axis of rotation 12, 22 and second mass symmetry axis 23 is situated on a second side 103 opposite a first side 102 in parallel to main plane of extension 100 and with respect to first and second axis of rotation 12, 22 such that acceleration 101 produces an oppositely directed first and second rotary motion 104, 105. This is caused by the asymmetrical suspension and/or by an asymmetrical mass distribution of the respective seismic mass 10, 20 with respect to the corresponding axis of rotation 12, 22, the asymmetrical suspension or mass distribution being preferably produced by a variably selectable extension of respective seismic mass 10, 20 in parallel to main plane of extension 100. First and second rotary motion 104, 105 results in an antiphase change of distance between first and second seismic mass 10, 20 on the first and the second side 102, 103. This is detected by measuring a first electrical capacitance 3 between a first electrode 14 on first seismic mass 10 and on first side 102 and a second electrode 24 on second seismic mass 20 and on first side 102, which second electrode 24 at least partially overlaps first electrode 14 perpendicular to main plane of extension 100. At the same time, a second electrical capacitance 3' is measured between another first electrode 14' on first seismic mass 10 and on second side 103 and another second electrode 24' on second seismic mass 20 and on second side 103, which second electrode 24' at least partially overlaps additional first electrode 14' perpendicular to main plane of extension 100. First and second rotary motion 104, 105 result in a change of the first and of the second capacitance 3, 3', the respective change being converted into a first and a second voltage signal 4, 4' and/or into a joint differential signal 5.

Figure 3:
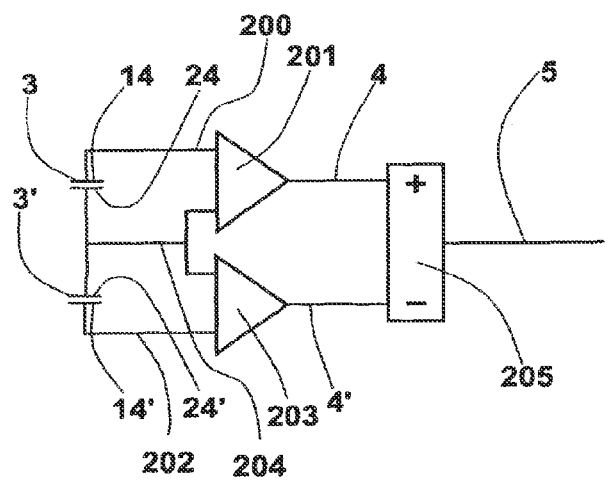
FIG. 3 shows a schematic view of the method for operating a micromechanical sensor element according to the exemplary embodiment of the present invention.

FIG. 3 shows a schematic view of the method for operating a micromechanical sensor element 1 according to the exemplary specific embodiment of the present invention, first and second electrode 14, 24 being represented as the first capacitor having the electrical capacitance 3 and the additional first and the additional second electrode 14', 24' being represented as the second capacitor having the second electrical capacitance 3'. First electrode 14 is connected to a first capacitance voltage converter 201 by a first conductor track 200, while additional first electrode 14' is connected to a second capacitance voltage converter 203 by a second conductor track 202. Second electrode 24 and additional second electrode 24' are jointly connected by a third conductor track 204 both to the first as well as to the second capacitance voltage converter 201, 203. First capacitance voltage converter 201 produces a first voltage signal 4 proportional to a change of first capacitance 3 and second capacitance voltage converter 203 produces a second voltage signal 4' proportional to a change of second capacitance 3'. First and second voltage signal 4, 4' are converted by a differential amplifier 205 into a differential signal 5 that is proportional to acceleration 101.

What is claimed is:

1. A micromechanical sensor element, comprising:
   a substrate;
   a first seismic mass suspended from the substrate, wherein the first seismic mass is rotatable from a first rest position by an acceleration acting perpendicularly to a main plane of extension of the first seismic mass; and
   a second seismic mass suspended from the substrate asymmetrically from the first seismic mass and rotatable by the acceleration from a second rest position;
   wherein at least a partial overlap between the first seismic mass and the second seismic mass is provided perpendicular to the main plane of extension.

2. The micromechanical sensor element as recited in claim 1, wherein the first seismic mass is fastened on the substrate rotatably about a first axis of rotation using a first coupling device, and wherein the second seismic mass is fastened on the substrate rotatably about a second axis of rotation using a second coupling device, the first and second axes of rotation being situated at least one of (a) in parallel to each other, and (b) substantially congruently perpendicular to the main plane of extension.

3. The micromechanical sensor element as recited in claim 2, wherein the first seismic mass has a first mass symmetry axis and the second seismic mass has a second mass symmetry axis, the first and second mass symmetry axes being oriented substantially parallel to the first and second axes of rotation, and the first mass symmetry axis being situated so as to be set apart from the second mass symmetry axis in parallel to the main plane of extension.

4. The micromechanical sensor element as recited in claim 3, wherein the mass of the first seismic mass and the mass of the second seismic mass differ.

5. The micromechanical sensor element as recited in claim 3, wherein the first seismic mass and the second seismic mass are integrated into a housing having a cover.

6. The micromechanical sensor element as recited in claim 1, wherein the first and second coupling elements are situated congruently and perpendicularly to the main plane of extension, and wherein the first and second coupling elements are at least one of torsional and bending spring elements.

7. The micromechanical sensor element as recited in claim 1, wherein (a) the first coupling element is fastened directly on the substrate, and (b) the second coupling element is fastened directly on at least one of the first coupling element, the substrate and the first seismic mass.

8. A micromechanical sensor element comprising:
a substrate;
a first seismic mass suspended from the substrate, wherein the first seismic mass is deflectable from a first rest position by an acceleration acting perpendicularly to a main plane of extension of the first seismic mass; and
a second seismic mass deflectable by the acceleration from a second rest position;
wherein at least a partial overlap between the first seismic mass and the second seismic mass is provided perpendicular to the main plane of extension;
wherein the first seismic mass is fastened on the substrate rotatably about a first axis of rotation using a first coupling device, and wherein the second seismic mass is fastened on the substrate rotatably about a second axis of rotation using a second coupling device, the first and second axes of rotation being situated at least one of (a) in parallel to each other, and (b) substantially congruently perpendicular to the main plane of extension;
wherein the first seismic mass has a first mass symmetry axis and the second seismic mass has a second mass symmetry axis, the first and second mass symmetry axes being oriented substantially parallel to the first and second axes of rotation, and the first mass symmetry axis being situated so as to be set apart from the second mass symmetry axis in parallel to the main plane of extension;
wherein the first seismic mass has first and second first-seismic-mass electrodes, wherein the second seismic mass has first and second second-seismic-mass electrodes, and wherein an overlap is provided perpendicularly to the main plane of extension between the first first-seismic-mass electrode and the first second-seismic-mass electrode, and between the second first-seismic-mass electrode and the second second-seismic-mass electrode.

9. The micromechanical sensor element as recited in claim 8, wherein (a) at least one of the first mass symmetry axis and the first axis of rotation extends between the first and second first-seismic-mass electrodes, and (b) at least one of the second mass symmetry axis and the second axis of rotation extends between the first and second second-seismic-mass electrodes.

* * * * *